(12) United States Patent
Moore (10) Patent No.: US 7,855,880 B2
(45) Date of Patent: Dec. 21, 2010

(54) LOW COST DISASTER RESISTANT DATA STORAGE MODULE

(75) Inventor: Robby Jay Moore, Auburn, CA (US)

(73) Assignee: Auburn I.P. Holdings LLC, Auburn, CA (US)

( * ) Notice: Subject to any disclaimer, the term of this patent is extended or adjusted under 35 U.S.C. 154(b) by 24 days.

(21) Appl. No.: 12/319,019

(22) Filed: Dec. 31, 2008

(65) Prior Publication Data

US 2009/0179536 A1    Jul. 16, 2009

Related U.S. Application Data

(60) Provisional application No. 61/010,458, filed on Jan. 9, 2008, provisional application No. 61/132,230, filed on Jun. 17, 2008.

(51) Int. Cl.
*G06F 1/16* (2006.01)

(52) U.S. Cl. .............. 361/679.33; 427/430.1; 174/539

(58) Field of Classification Search .............. 427/430.1; 174/50, 539; 361/679.33
See application file for complete search history.

(56) References Cited

U.S. PATENT DOCUMENTS

| | | | | |
|---|---|---|---|---|
| 5,262,926 A * | 11/1993 | Hall | .............. | 361/679.09 |
| 5,510,954 A * | 4/1996 | Wyler | .............. | 361/679.54 |
| 5,596,483 A * | 1/1997 | Wyler | .............. | 361/679.47 |
| 5,637,362 A * | 6/1997 | Chase et al. | .............. | 428/15 |
| 6,005,768 A * | 12/1999 | Jo | .............. | 361/679.34 |
| 6,154,360 A * | 11/2000 | Kaczeus et al. | .............. | 361/679.34 |
| 6,158,833 A * | 12/2000 | Engler | .............. | 312/409 |
| 6,243,262 B1 * | 6/2001 | Koo et al. | .............. | 361/679.46 |
| 6,567,265 B1 * | 5/2003 | Yamamura et al. | .............. | 361/679.34 |
| 6,781,829 B2 * | 8/2004 | Hein | .............. | 361/679.33 |
| 7,177,147 B2 * | 2/2007 | Su | .............. | 361/679.33 |
| 7,211,742 B2 * | 5/2007 | Moore et a | .............. | 174/539 |
| 7,291,784 B2 * | 11/2007 | Moore et al. | .............. | 174/50 |
| 2002/0097556 A1 * | 7/2002 | Lee | .............. | 361/685 |
| 2004/0207980 A1 * | 10/2004 | Kobayashi | .............. | 361/685 |
| 2007/0061598 A1 * | 3/2007 | Bitton et al. | .............. | 713/194 |
| 2009/0050365 A1 * | 2/2009 | Moore et al. | .............. | 174/547 |

* cited by examiner

*Primary Examiner*—Lisa Lea-Edmonds
(74) *Attorney, Agent, or Firm*—Bruce H. Johnsonbaugh (57) ABSTRACT

A disaster resistant data storage module is provided. In a preferred embodiment, the module is sized to fit into a standard drive bay inside the chassis of a personal computer or server. Standard sized hard drives may be utilized. For example a 2.5 inch standard hard drive may be placed in a protective enclosure which is in turn sized to fit in a standard 3.5 inch drive bay. Another aspect of the invention is to provide a highly reflective exterior surface or coating which reflects radiant energy from a fire but which simultaneously conducts heat generated by a data storage device carried within the module.

6 Claims, 9 Drawing Sheets

LOW COST DISASTER RESISTANT DATA STORAGE MODULE

CROSS-REFERENCE TO RELATED APPLICATIONS

This application claims the benefit of and priority from U.S. provisional applications Ser. No. 61/010,458 filed Jan. 9, 2008 and Ser. No. 61/132,230 filed Jun. 17, 2008.

BACKGROUND AND BRIEF SUMMARY

The present invention pertains generally to techniques for providing "disaster resistant" operational hard drives and other data storage devices. The need for protecting data grows more acute as ever increasing amounts of valuable and/or irreplaceable data are stored on hard drives and other data storage devices. Various prior art systems have been developed for providing such disaster resistance, including U.S. Pat. Nos. 7,211,742 and 7,291,784, both of which are incorporated by reference. The common feature shared by the systems taught by the '742 and '784 patents (and other prior art known to applicant) is that an external enclosure is required which houses an operational hard drive (or other data storage device).

The present invention departs from the prior art in that it provides for the first time in one embodiment, a low cost, internal, disaster resistant, operational data storage module that is carried in a standard drive bay of a server or personal computer! No external components are required to be purchased or installed by the user. The module includes a hard drive (or other data storage device), a disaster resistant enclosure, and means for mounting the module in a standard drive bay. Disaster resistant, for the purposes of this patent, is defined as features when added to a low cost, internal, operational data storage module, allow the internal module to protect against data loss due to exposure to extreme physical environments such as fire, flood, water damage, shock, building collapse, etc.

A significant aspect of the invention is that in a preferred embodiment, the disaster resistant module is low cost, single use (i.e. single disaster) and disposable. For reasons described below, the expected cost is 90% less than the cost of a comparable external device of the prior art. Since the module of the present invention is mountable in a standard drive bay, it has a standard size and may be mass produced and integrated by existing system manufacturers which use non-disaster resistance standard bay data modules in their assembly process. Since the cost is minimized by being mass produced, the disaster resistant hard drive is designed to withstand only a single disaster, thereby being disposable. The disposability of the device eliminates the need to design access to the hard drive for servicing, which in turn allows the use of a robust design of the disaster resistant enclosure for the hard drive enabling a greater chance of a successful data recovery after a disaster has occurred.

A further significant aspect in minimizing the cost of the invention is that standard, form factor, hard drives may be utilized. For example, standard drive bays are presently designed to accept hard drives that are 1 inch, 1.8 inch, 2.5 inch, 3.5 inch or 5.25 inch form factors. In one embodiment of the invention, a standard hard drive currently used in a 2.5 inch drive form factor is placed in a disaster resistant enclosure that is sized to fit in a standard 3.5 inch drive bay.

A primary object of the invention is to provide a disaster resistant internal data storage module usable in personal computers and servers to protect against data loss and facilitate data recovery after a fire, flood, shock, building collapse, or water damage event.

A further object is to utilize the standard form factor of standard drive bays for mounting the module of the present invention, thereby minimizing the cost.

A further object of the invention is to provide a disaster resistant internal data storage module having a cost of manufacture that is approximately 90% less than an external disaster resistant module having the same data storage capacity.

Another object is to provide, in one embodiment of the invention, a highly reflective outer surface which reflects radiant heat from a fire but which also conducts heat outwardly generated by the operating data storage device.

Other objects and advantages will become apparent from the following description and drawings wherein:

DETAILED DESCRIPTION OF THE DRAWINGS

Figure 1:
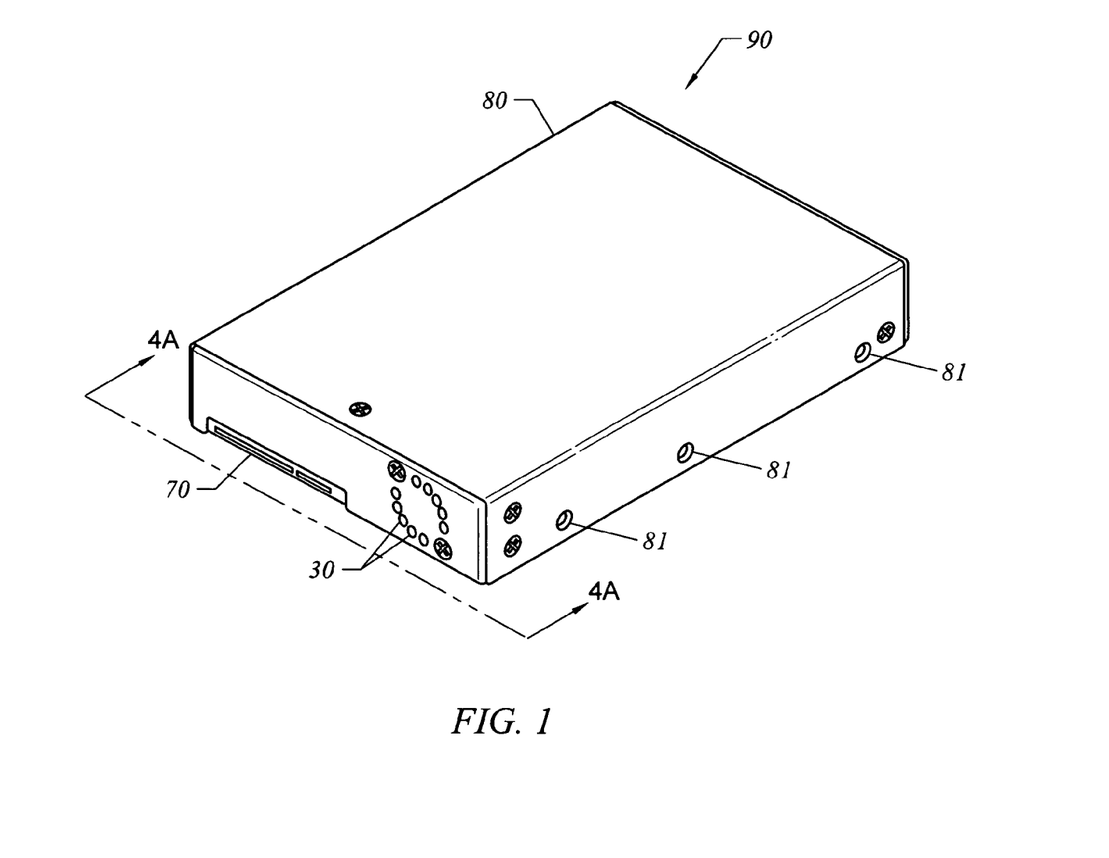
FIG. 1 is a perspective view of a first embodiment of the disaster resistant module of the present invention.

FIG. 1 is a perspective view showing the module 90 of the present invention before it is installed into a standard drive bay of a personal computer chassis or server chassis. The outer skin 80 is visible in FIG. 1 and preferably comprises a metal skin to which a highly reflective polished surface or reflective coating has been applied. Optional materials that may be used include ceramics or plastics with reflective coatings or surfaces. The highly reflective surface is capable of reflecting as much as 98% of the radiant energy of a fire. Also visible in FIG. 1 is a standard power and data interface 70. This interface allows the module 90 to be fully operational as a data storage device with its disaster resistant enclosure surrounding the hard drive itself, as shown in greater detail below.

Figure 2:
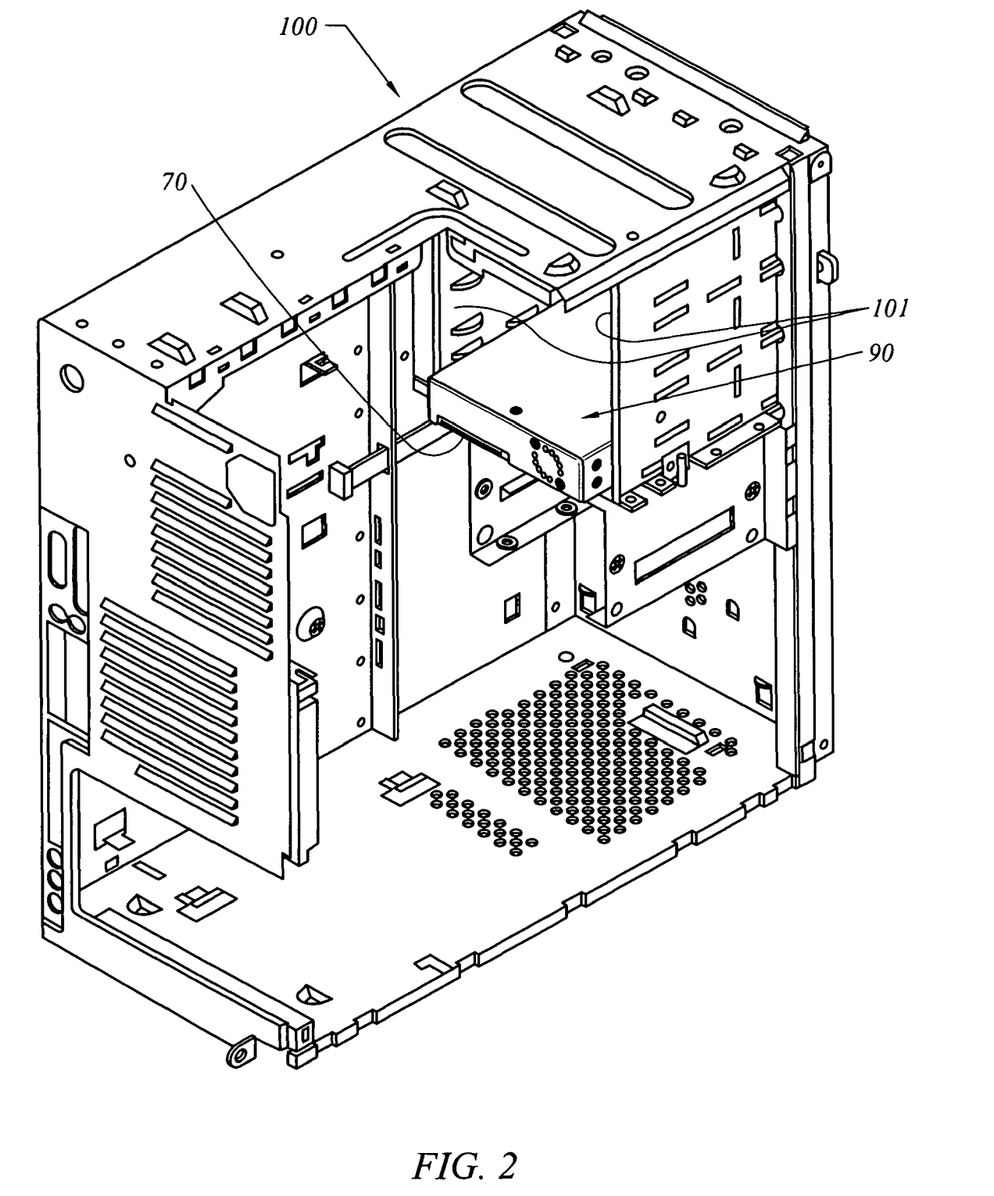
FIG. 2 is a perspective view, partially broken away, of a personal computer chassis showing the module of FIG. 1 mounted in a standard drive bay.

FIG. 2 illustrates in perspective view a standard typical personal computer chassis 100 having a standard drive bay 101. The module 90 of FIG. 1 is shown in position in standard drive bay 101. The data and power interface 70 is ready to be connected to power and data lines (not shown in FIG. 2 for clarity).

Figure 3:
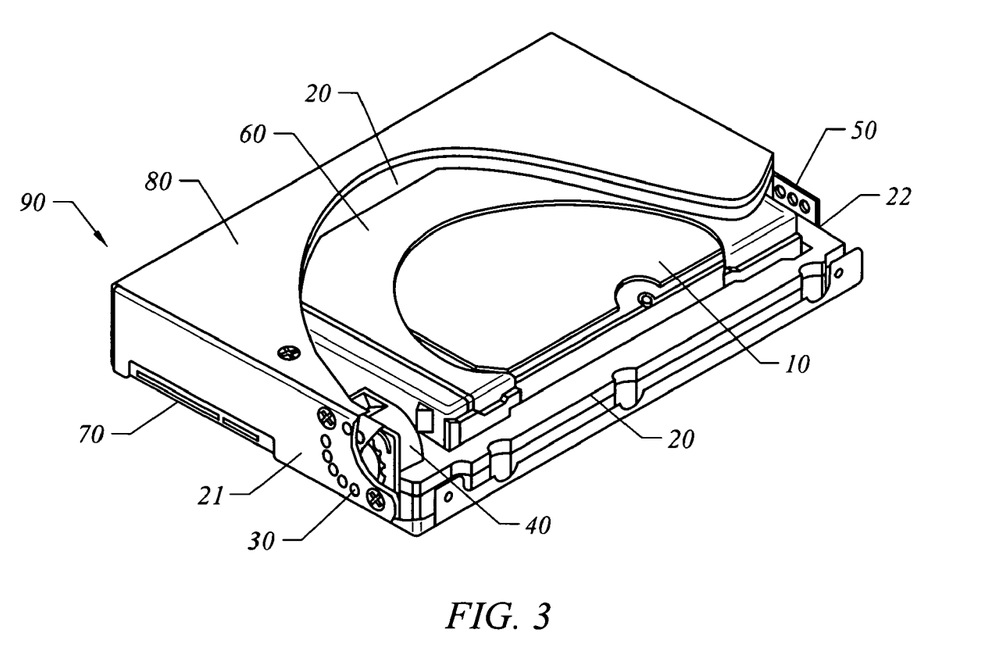
FIG. 3 is a perspective view, partially broken away, of the disaster resistant module shown in FIGS. 1 and 2.

FIG. 3 illustrates the module 90 shown in FIGS. 1 and 2. In FIG. 3 module 90 is illustrated in a partially broken away view. A data storage device 10 is shown which may be a conventional hard disk drive or hard drive or disk drive but could also be alternate forms of electronic data storage devices such as solid state memory, solid state drive, solid state disk, random access memory (RAM) or any other means to store and retrieve active digital computer data without limitation. The data storage device 10 or hard drive 10 is surrounded by an enclosure comprising a layer 20 of fireproof material, preferably molded gypsum. Molded gypsum tends to be relatively inexpensive and relatively easily molded. Optional materials that may be used include fire resistant insulation, foam or wax. An optional waterproof layer comprising a bag, extrusion or coating 60 may be applied to and carried by the surface of hard drive 10. The waterproof extrusion can also serve to provide structural integrity during periods of extreme stress due to building collapse or impact. Waterproof coatings or bags can be applied that also provide elastomeric cushioning to reduce impact loads and penetration by foreign objects during building collapse, impact or other disaster. The waterproof layer may be constructed of a metal extrusion or elastomeric material.

The molded fire resistant enclosure 20 is provided with a plurality of optional vent openings 30 in front and rear walls 21,22. These vent openings allow air to flow through the enclosure to prevent hard drive 10 from overheating. An intumescent coating or intumescent paint 50 may be applied to vent holes 30 to close holes 30 in the event of fire. Alternately, movable hatches could be mounted in vent holes 30 as described in U.S. Pat. No. 7,211,742. The intumescent coating 50 may be applied to all or a portion of the exterior of fireproof material molded enclosure 20.

An optional fan 40 may be provided inside enclosure 20 to create forced ventilation through module 90 to keep the operating data storage device 10 from overheating.

A metallic skin 80 surrounds the fireproof material molded enclosure 20. The skin 80 may be steel, aluminum or rigid, conductive plastic and preferably carries a highly reflective polished surface or highly reflective coating on its exterior surface to reflect radiant energy in a fire.

It is significant to note that module 90 of FIG. 3 is designed with the intention that it be received in a standard drive bay.

Figure 4A:
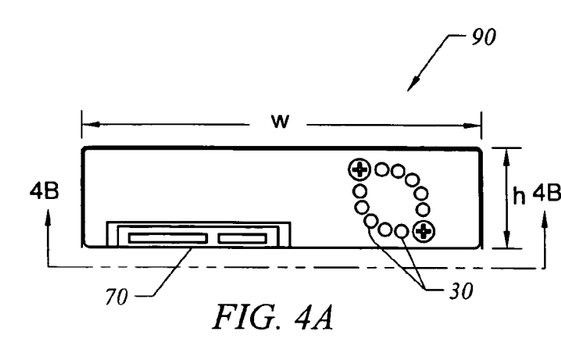
FIGS. 4A, 4B and 4C are front, bottom and side views of the module shown in FIGS. 1-3.
Figure 4B:
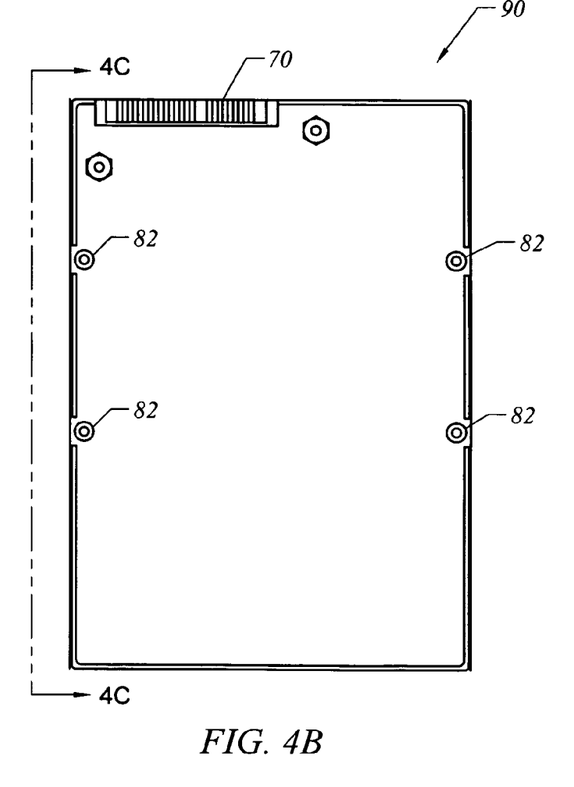
Figure 4C:
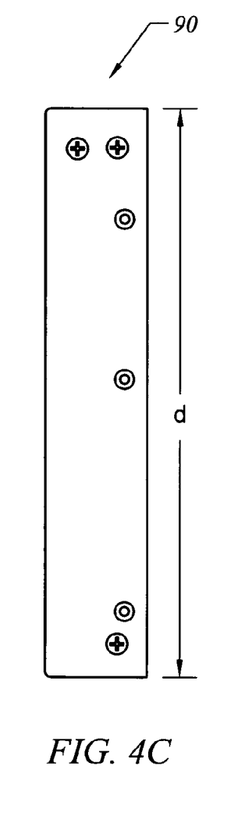

FIGS. 4A-4C illustrate the dimensional aspects of one embodiment of module 90 allowing the module to be fitted into a standard drive bay. A dimensional example of the invention is shown in FIGS. 4A-4C. Module 90 in FIG. 4A has a height h of 1 inch, and a width w of 4 inches and a length d, as shown in FIG. 4B, of 5.75 inches, to allow module 90 to slide into a standard 3.5 inch form factor drive bay (which has an actual width of 4 inches) such as drive bay 101 illustrated in FIG. 2. It is also significant to note that the module 90 shown in FIGS. 1, 3 and 4A-4C preferably utilizes a standard hard drive 10 that is commonly used in a 2.5 inch standard drive bay. By using a standard size hard drive, the cost of the hard drive, itself, is considerably reduced. According to the invention, the protective disaster resistant enclosure surrounding the hard drive is sized to be accepted readily in a standard 3.5 inch form factor drive bay as illustrated in FIG. 2.

Alternately, a standard drive bay sized to accept a standard 2.5 inch drive form factor may be utilized. A smaller standard 1.8 inch or 1.0 inch drive is utilized. The enclosure, optional metal skin and optional waterproof enclosure are sized to produce a resultant disaster resistant module that fits or slides into a standard 2.5 inch form factor drive bay (which actually has a width of 2.75 inches).

A mounting means is provided wherein the module 90 is attached to the standard drive bay. As shown in FIG. 1, standard mounting holes 81 are provided in the skin 80 for receiving screws that extend through the standard drive bay into the side of the skin 80 of module 90. As shown best in FIG. 4C, mounting holes 82 are also provided in the bottom of module 90 and are aligned with mounting holes located in the standard drive bay.

Figure 5:
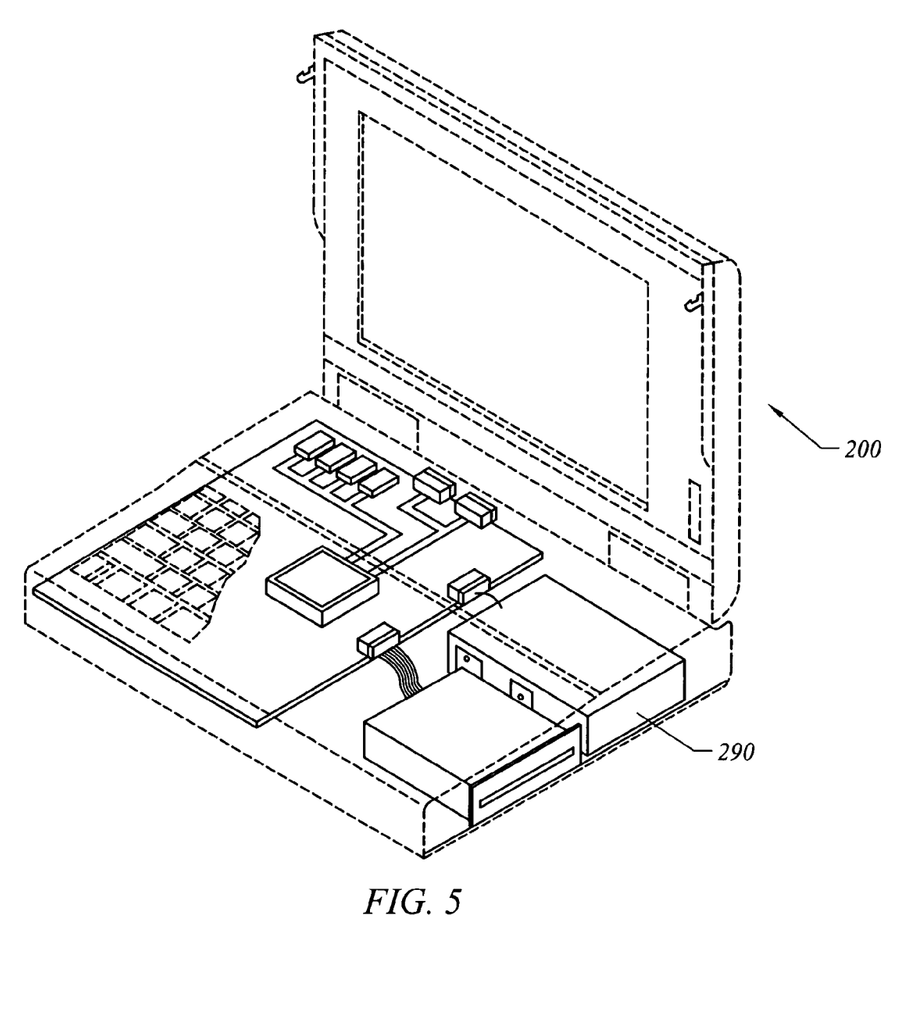
FIG. 5 is a perspective view showing how the module of the present invention may be utilized in conjunction with a lap top computer.

FIG. 5 is a perspective view of a laptop computer 200 in which the module 290 of the present invention is mounted.

Figure 6:
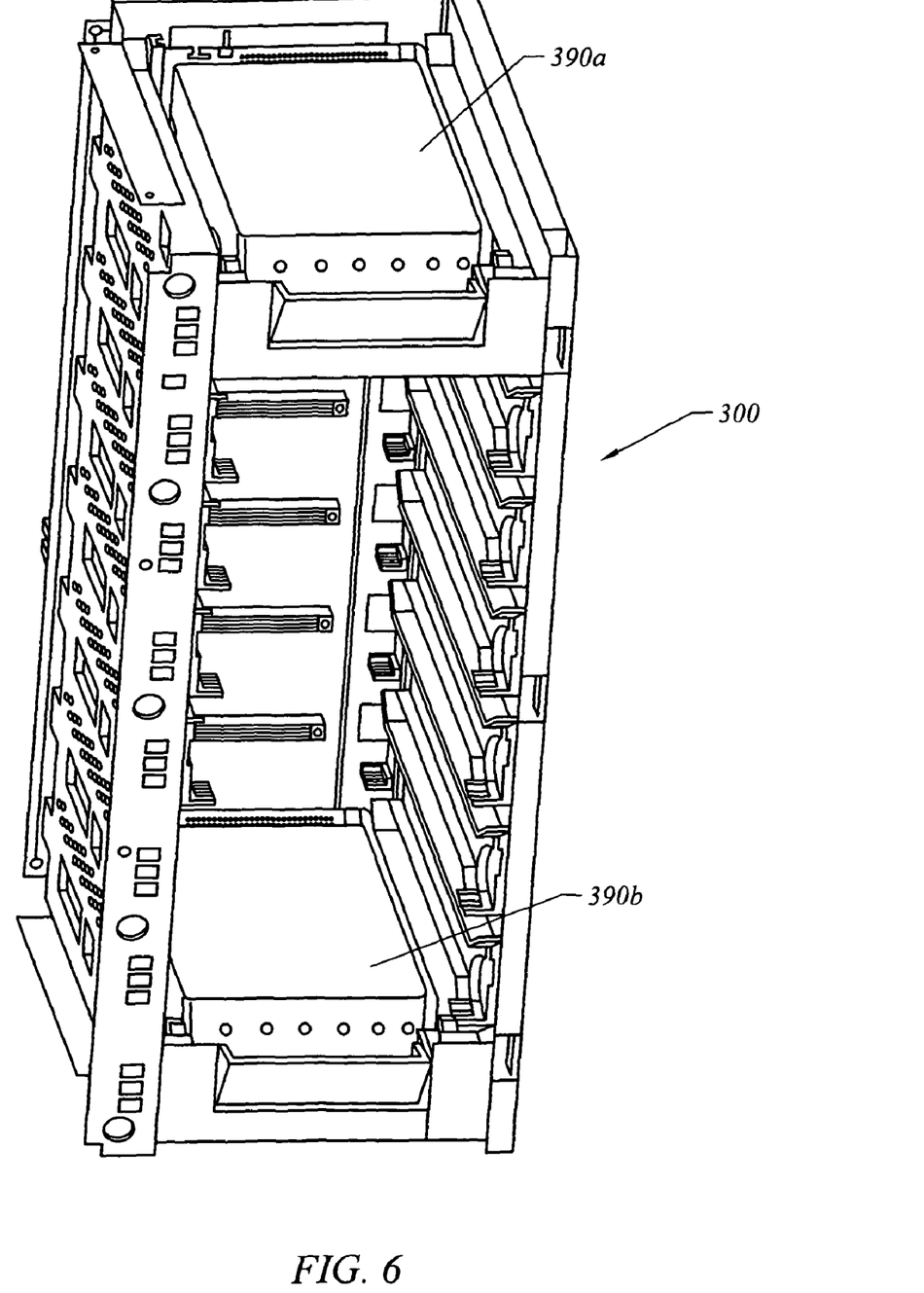
FIG. 6 is a perspective. view showing how the module of the present invention may be mounted in two or more standard drive bays of a multiple drive docking chassis for use in a computer or server.

FIG. 6 is a perspective view of the chassis 300 of a multiple drive docking unit, or of a server, in which two modules 390a and 390b of the present invention are mounted.

Figure 7A:
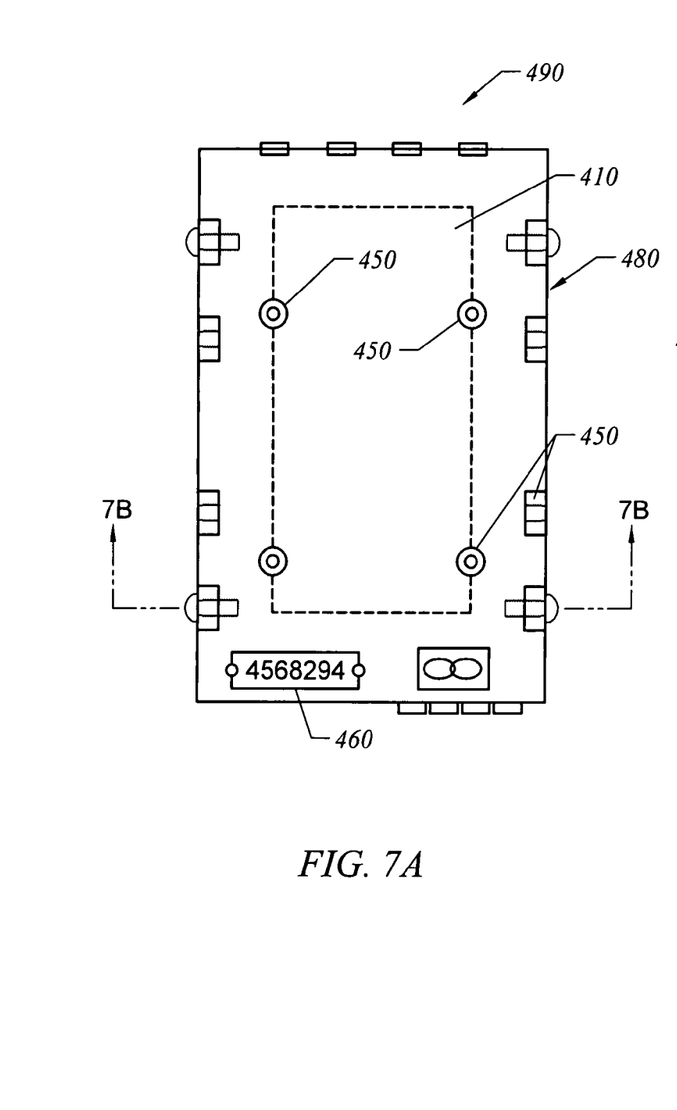
FIGS. 7A and 7B are plan and sectional views of a module having "strengthened" threads.
Figure 7B:
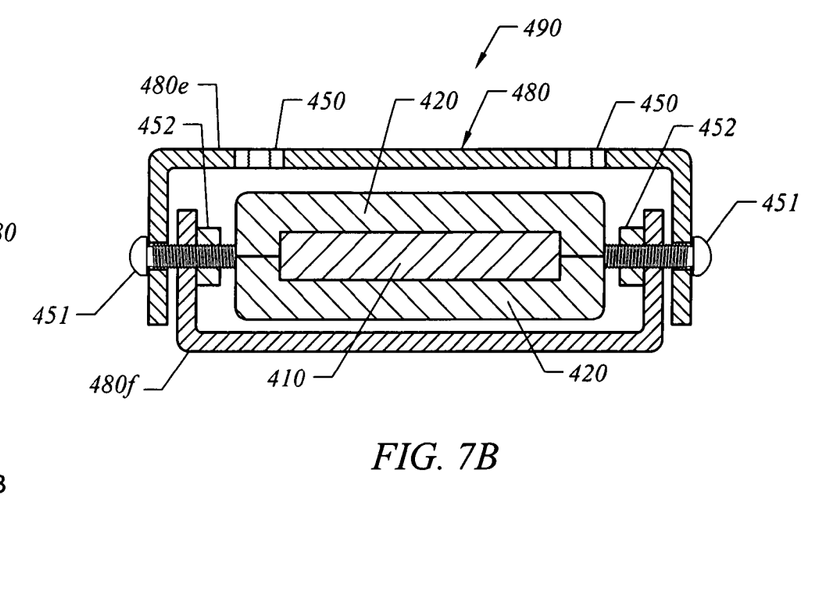

As shown in FIGS. 7A and 7B, another aspect of the invention is the use of strengthened threaded components to attach the skin 480 of module 490 rigidly to the chassis (not shown, in FIGS. 7A-7B) of the personal computer or server. By incorporating strengthened thread anchors, the product can withstand considerable torque experienced during manufacturing as well as maintain structural integrity during a fire extreme heat event. Sheet metal, used as the main outer "skin" has advantages of being cost effective but has a significant drawback in terms of its threaded strength. One cannot expect sufficient thread strength by simply drilling and tapping threads directly into thin sheet metal. Sufficient threaded strength is required for this miniature disaster proof enclosure due to its application inside a standard hard drive bay. During installation, over 5 in-lbs of torque can be developed by the installer which can easily strip weak threads in the 2-56, 4-40 or 6-32 size range. Additionally, strength is required to withstand stresses induced from extreme heat, thermal expansion and structural collapse during a disaster event. Thus, incorporation of strengthened threaded anchors in a standard form factor disaster proof enclosure can significantly improve manufacturing throughput (up to 50% less scrapped parts) and fire performance (up to 75% greater pullout force). Strengthened thread anchors may include but not be limited to: press fit threaded inserts (a.k.a. "PEM" nuts), captive or bonded nuts, extrude and tap thread technique (extruding sheet metal in a cylinder to form additional threads) or "roll formed" or "roll and tap" features in the sheet metal parent material.

As shown in FIGS. 7A and 7B, strengthened threaded mounting holes 450 are provided in the base and sides of skin 480 surrounding enclosure 420, which are adapted for a standard drive bay. In the embodiment shown in FIG. 7A, the enclosure 420 and skin 480 are sized to fit inside a 3.5 inch drive bay. Strengthened threaded anchors 452 (FIG. 7B) are also present for screws 451 used to connect upper 480e and lower 480f parts of skin 480 (FIG. 7B). The enclosure 420 and skin 480 have dimensions that are sized to fit within this standardized drive bay opening. It is understood that the invention also includes embodiments that are sized for other standard drive bays (5.25 inch and 2.5 inch standard drive bays). It is also to be understood that the mounting holes for the smaller enclosures are sized to be accepted in the smaller standard drive bays. Skin 480 preferably has a highly reflective surface formed by polishing a metallic surface or by coating a metallic or plastic skin with a highly reflective coating.

Engraving or stamping a permanent serial number to the outside of the chassis is also a significant improvement for this device. During a disaster, such as a fire, any paper based labels can be destroyed due to the high heat or possible water damage. Permanently engraving or stamping the serial number in the metallic outer chassis allows for significantly better identification of the hard drive device 410. Once identified, the disaster proof hard drive configuration and disaster recovery plan can be determined immediately. Additionally, an engraving, stamping or permanent serial number allows us to reduce disaster recovery costs by 10% by determining in advance if the particular unit is under warranty prior to disassembly by our factory or recovery service partner. A permanent serial number feature as a part of a hard drive device 410 is unique and valuable.

Also shown in FIG. 7A is a permanent serial number 460 which could be stamped, engraved or laser etched into the surface of the skin 480. Alternatively, the permanent serial number could also be attached and made from a fire proof material such as metal, ceramic or comparable high temperature substrate.

Figure 8A:
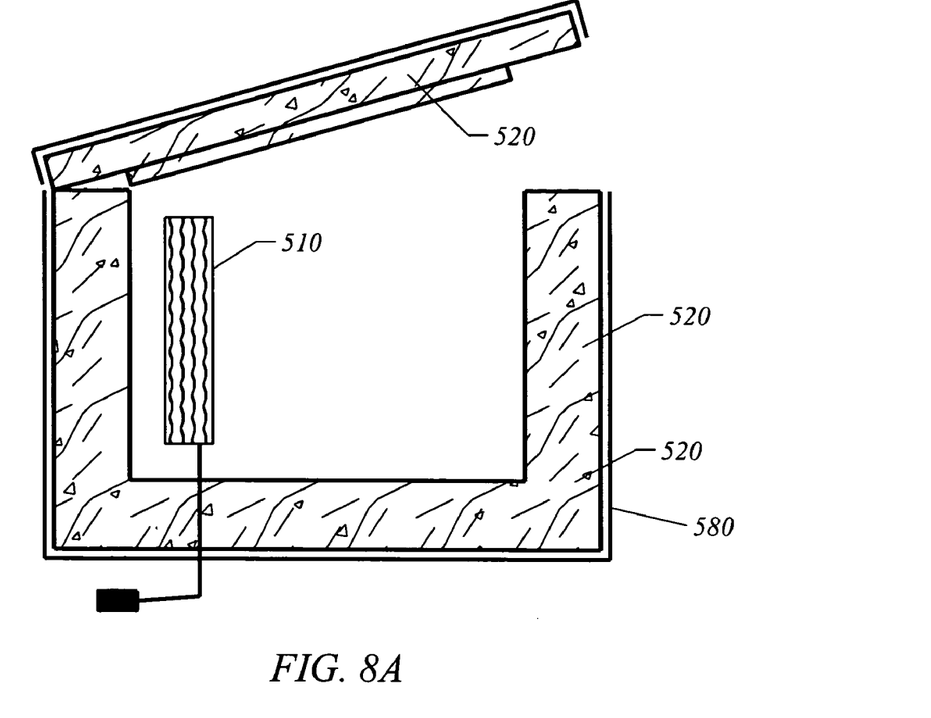
FIGS. 8A, 8B and 8C are sectional views of an external module having a highly reflective coating, layer or skin.
Figure 8B:
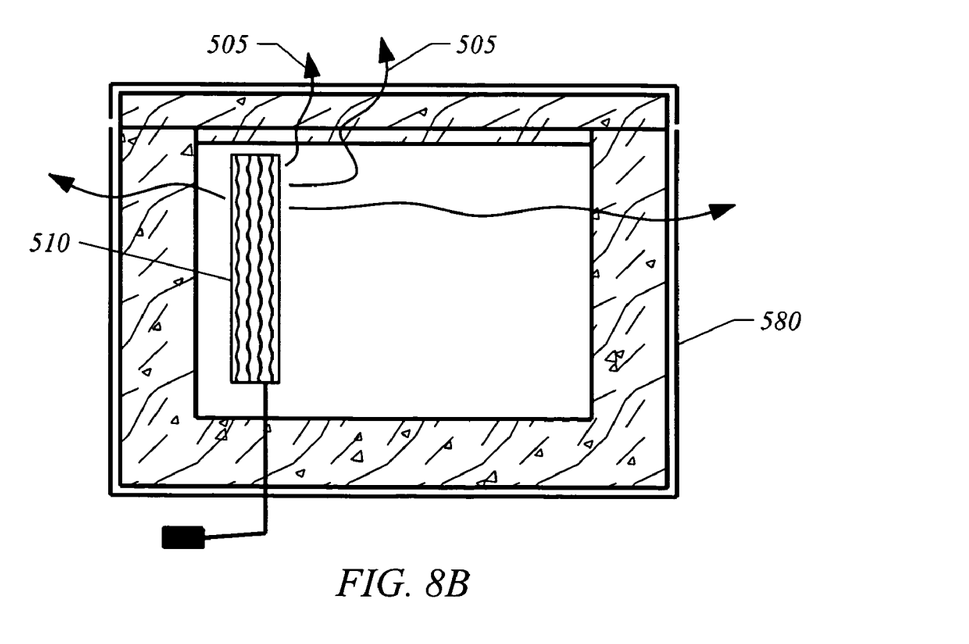
Figure 8C:
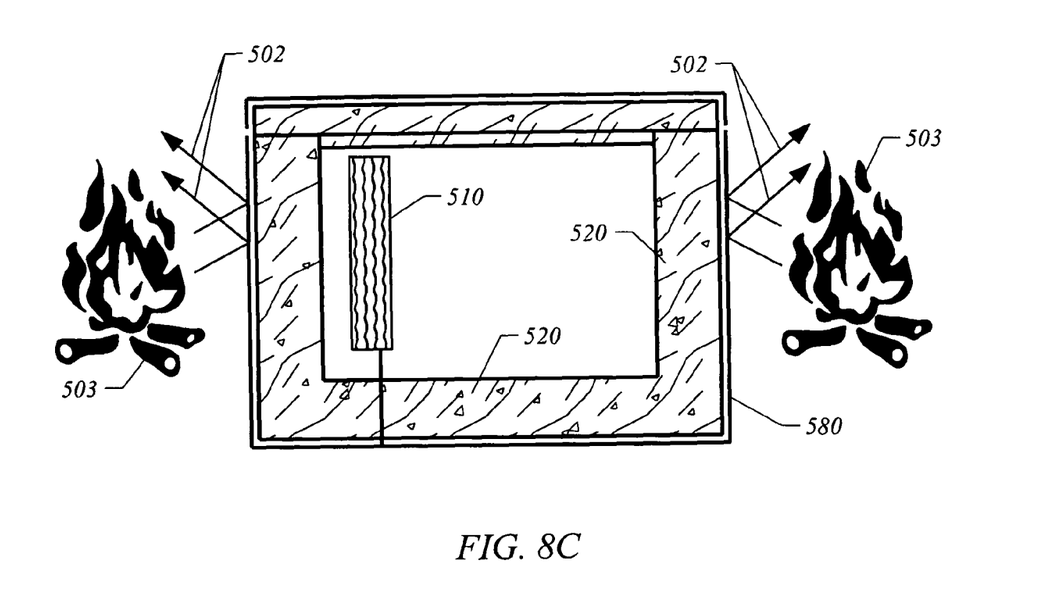

FIGS. 8A-8C illustrate data storage device 510 carried inside an external (i.e. mounted outside the chassis of a personal computer or server) disaster resistant enclosure 520 with a highly reflective skin 580. The reflective skin 580 surrounds the fireproof material of the external enclosure 520. The skin 580 may be polished steel, polished aluminum or a heat conductive plastic with a highly reflective coating or polished surface on its exterior surface to reflect radiant energy in a fire. FIG. 8C illustrates how a reflective surface or coating on skin 580 reflects radiant energy shown by arrows 502 created by a fire 503. Examples of a highly reflective coating are bright nickel or bright chrome plating. The preferred reflective surface is highly polished aluminum. During normal operation (FIG. 8B) some of the heat from the data storage device is conducted through the fireproof insulating walls of enclosure 520 (as shown by arrows 505) and skin 580 to provide cooling. The disadvantage to this architecture is that fireproof insulating material used without a conductive and reflective skin typically provides a poor conduction path for waste heat to be dissipated properly. U.S. Pat. No. 6,158,833 (Engler) and U.S. Pat. No. 5,479,341 (Pihl) both teach disaster resistant data storage enclosures which must dissipate the waste heat through the relatively thick walls of the enclosure. A significant design compromise must be made between thickness of the fireproof wall which dictates the fire endurance and the thinness of the wall which dictates the ability to dissipate internally generated heat. No prior art known to applicant has considered the benefits of combining highly reflective outer coatings or layers with disaster resistant data storage devices to further optimize (i.e. minimize) the wall thickness for both normal operation and fire protection.

Applicant estimates that 40% thinner walls and over 50% weight reduction can be achieved by utilizing highly reflective skins or outer surfaces on a disaster resistant data storage device with no penalty in fire resistance. Alternatively, retaining the original wall thickness and adding a reflective coating or skin (as shown in FIG. 8B) can increase fire endurance by over 50% and have no negative impact in the original ability to dissipate heat. Benefits include using 25% more power for additional electronic components within the enclosure, lower shipping costs by over 50% and lower manufacturing costs by 10%. Combining highly reflective outer coatings, layers or skins with prior art ventilated air cooling, as shown in U.S. Pat. Nos. 7,211,742 and 7,291,784, both of which are incorporated by reference, can further extend the benefits of smaller, lighter and less expensive disaster resistant storage device enclosures.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A disaster resistant, internal, operational data storage module carried in a standard drive bay of a computer or server, comprising:
   a computer or server chassis with a standard drive bay, and
   a module carried in said standard drive bay, said module comprising:
   a data storage device,
   a disaster resistant enclosure means for carrying and protecting said data storage device,
   power and data connectors carried by said data storage device, said connectors extending through said disaster resistant enclosure means,
   means for mounting said data storage device and said disaster resistant enclosure means in said standard drive bay,
   wherein said disaster resistant enclosure means comprises a layer of fire resistant insulation such as gypsum or fire resistant wax or fire resistant foam, and
   a layer of intumescent material or intumescent paint over said layer of fire resistant insulation.

2. A disaster resistant, internal, operational data storage module carried in a standard drive bay of a computer or server, comprising:
   a computer or server chassis with a standard drive bay, and
   a module carried in said standard drive bay, said module comprising:
   a data storage device,
   a disaster resistant enclosure means for carrying and protecting said data storage device,
   power and data connectors carried by said data storage device, said connectors extending through said disaster resistant enclosure means,
   means for mounting said data storage device and said disaster resistant enclosure means in said standard drive bay,
   wherein said disaster resistant enclosure means comprises a layer of fire resistant insulation such as gypsum or fire resistant wax or fire resistant foam,
   a sheet metal skin or rigid plastic skin which encloses said layer of fire resistant insulation, and
   ventilation openings formed in said skin.

3. The apparatus of claim 2 further comprising a ventilation fan carried inside said skin.

4. The apparatus of claim 2 further comprising a serial number permanently applied to said skin designed to survive after exposure to a disaster environment.

5. A disaster resistant, internal, operational data storage module carried in a standard drive bay of a computer or server, comprising:
   a computer or server chassis with a standard drive bay, and
   a module carried in said standard drive bay, said module comprising:
   a data storage device,
   a disaster resistant enclosure means for carrying and protecting said data storage device,
   power and data connectors carried by said data storage device, said connectors extending through said disaster resistant enclosure means,
   means for mounting said data storage device and said disaster resistant enclosure means in said standard drive bay.

wherein said disaster resistant enclosure means comprises a layer of fire resistant insulation such as gypsum or fire resistant wax or fire resistant foam, and a waterproof layer carried by said data storage device.

6. The apparatus of claim 5 wherein said waterproof layer is constructed of a metal extrusion or elastomeric material to improve mechanical shock and/or reduce penetration from foreign objects during a disaster.

\* \* \* \* \*